United States Patent Office 3,328,857
Patented July 4, 1967

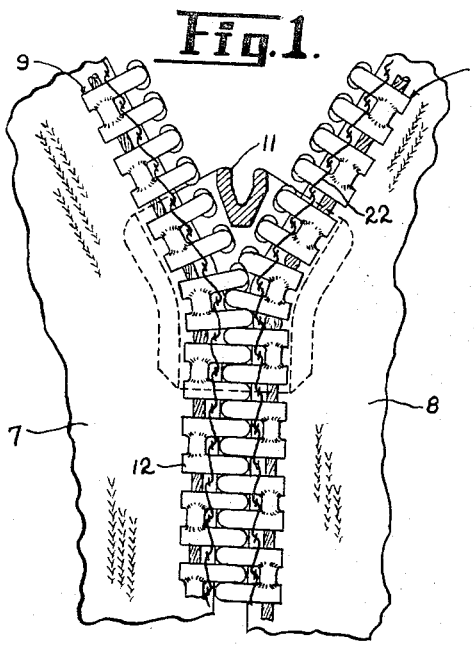
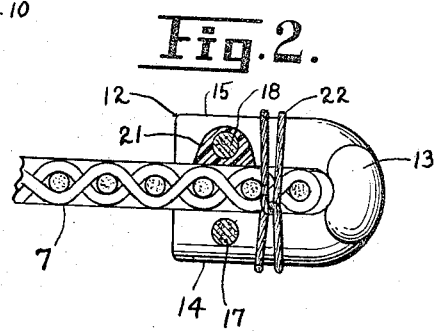
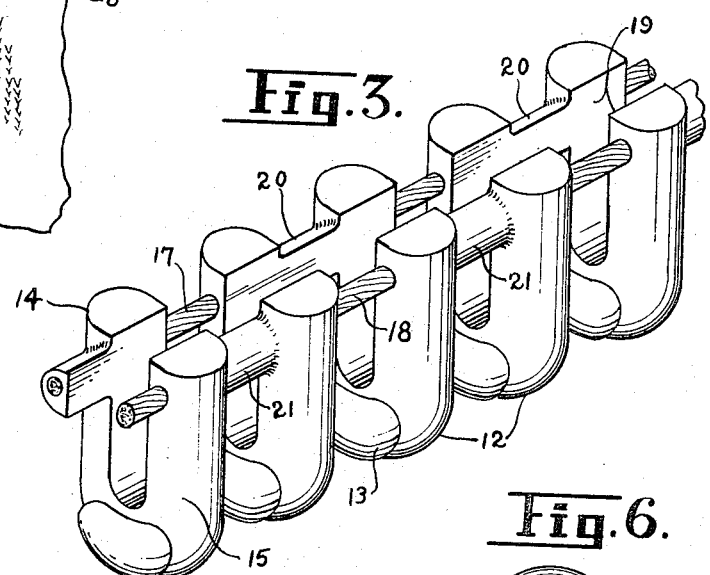
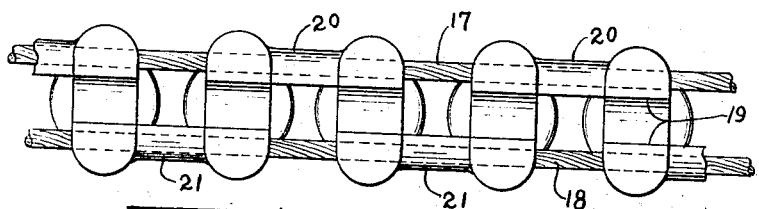
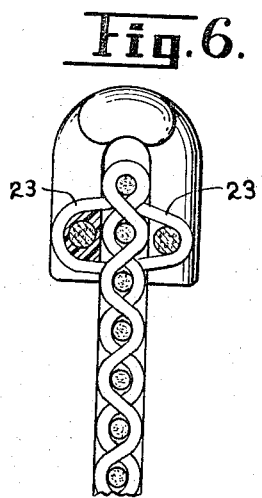
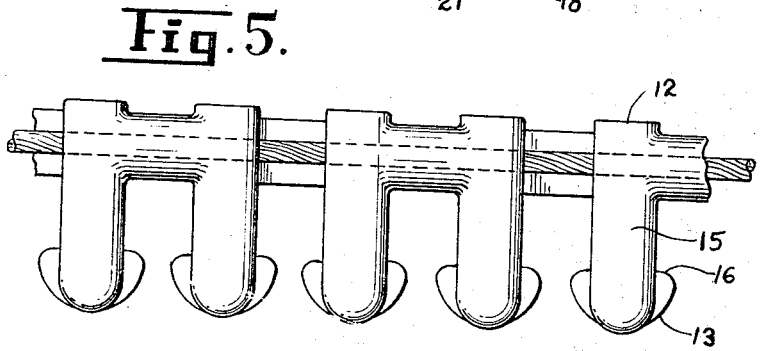

3,328,857
ZIPPER FASTENER STRINGER
John E. Burbank, Middlebury, Conn., assignor to Scovill Manufacturing Company, New Haven, Conn., a corporation of Connecticut
Filed Dec. 23, 1965, Ser. No. 515,964
3 Claims. (Cl. 24—205.13)

This invention relates to zipper fasteners and particularly to an improved connected series of individual plastic material fastener elements ready for attachment to a tape by sewing or other means.

Plastic zippers as now generally known, are made from continuous filaments in the form of a coil. In the stringer of this invention, the fastener elements are molded so that there are a series of individual elements, each with a head formed to interlock between the heads of a mating pair of fastener elements, each element having a pair of legs extending laterally one on each side of the stringer. The legs of each element are spaced apart so that a tape may be inserted between them.

In order to prevent stretching of the fastener stringer, the individual elements are connected by a pair of cords, one along each side of the stringer and having secured thereto the legs of the fastener elements. These cords are relatively inextensible as compared to plastic connections, but if they were the only connection, the stringer would be too unstable and the independent elements would be too loosely connected for proper co-operation with each other in the complete fastener.

According to the invention, alternate sections of each cord are covered with plastic, with those sections on one side of the fastener being staggered with respect to the covered sections of the cord on the other side of the fastener. Thus, while there is a continuous springy connection between all of the fastener elements, there is no undue stiffness, such as would be the result if all sections of the cord were covered with plastic material because the latter construction would have a truss-like effect to defeat flexibility in the direction where it is most desired.

My improved construction combines, therefore, the advantages of tensile strength, longitudinal stability, prevention of displacement of individual elements and the desired flexibility.

Other objects and advantages of the invention will hereinafter more fully appear.

In the accompanying drawing, I have shown for purpose of illustration, a preferred embodiment of the invention and one modification thereof. In the drawing:

FIG. 1 is a front view of a zipper having stringers made according to the invention;

FIG. 2 is a cross-section through one stringer showing how it may be attached to a tape;

FIG. 3 is a perspective view of the improved stringer;

FIG. 4 is an edge view looking toward the ends of the legs of the fastener elements;

FIG. 5 is a plan view of a section of the stringer; and

FIG. 6 is a cross-section indicating another method of attachment to the tape.

As indicated in FIG. 1, a complete zipper has the tapes 7 and 8, with left and right stringers generally designated 9 and 10 respectively, and any common form of slider 11.

Each of the stringers may be characterized as a series of spaced individual elements 12, each having a head 13 and a pair of spaced legs 14 and 15. The heads 13 can be formed with hook-like projections 16 as best seen in FIG. 5, so as to interlock with the head portions of a mating stringer.

The individual elements are connected and held at the desired relationship by a pair of cords 17 and 18. These may be of twisted textile material which is relatively inextensible. The cords are positioned well below the outer surfaces of the fastener element legs and preferably, as close as possible to the inner faces 19 of such legs.

Considering first the cord 17, it will be noted that alternate sections designated 20, are covered by plastic material preferably formed simultaneously with the molding of the fastener elements and thus, integrally joined to the fastener element legs. The cord 18 on the other side of the fastener which connects the legs 15 has similar sections 21 covered with molded plastic material, but it will be observed that the sections 21 are staggered with respect to section 20. Thus, as best observed in FIG. 4, any transverse section through the spaces between fastener elements will show the elements joined by only one such covered cord portion. Thus, the cord will have the necessary stability and the elements will be held in proper angular alignment while at the same time, the proper springy action or flexibility of the fastener is obtained. When the stringer is bent transversely in one direction, the bare portions of the cord can tend to collapse without any such truss effect as would result if all portions of the cord were stiffened.

In attaching the improved stringer to the tape which in FIG. 2 is designated by the numeral 7, it is only necessary to insert the edge of the tape between the fastener element legs 14 and 15, and secure them together by stitching 22 between the heads 13 and the cords 17 and 18. In this method of attachment, the cords 17 and 18 are placed as close as possible to the head 13 without having to crowd the needles required in the sewing operation.

If the fastener stringer is attached by weaving as indicated in FIG. 6, the cords may be much closer to the heads and if desired, the legs of the fastener elements may be considerably shorter. Since there is no necessity for allowing room for sewing needles, it is only necessary to allow enough for the filling threads 23 of the woven tape.

What I claim is:
1. A stringer for zipper fasteners comprising
   (a) a series of spaced individual fastener elements of plastic material each having a head and a pair of legs extending laterally from said head;
   (b) a pair of cords running lengthwise of the stringer;
   (c) one leg of each fastener element being secured to one cord on one side of the stringer while the other leg of each fastener element is secured to the other of said cords on the other side of said stringer, said cords being positioned within the outer surfaces of said fastener element legs; and
   (d) alternate sections of each cord in the spaces between fastener element legs being covered with plastic material and wherein the covered sections of one cord being staggered relative to the covered sections of the other cord.

2. A stringer for zipper fasteners as defined in claim 1, wherein the covered sections of the cord consists of molded plastic material integral with the adjacent fastener element legs.

3. A stringer for zipper fasteners as defined in claim 1, wherein said fastener element legs are molded around said cords with the cords being positioned close to the inner faces of said legs.

References Cited
UNITED STATES PATENTS
2,252,305  8/1941  Puschner.
3,165,793  1/1965  Lynch.

BERNARD A. GELAK, Primary Examiner.